United States Patent Office 3,188,328
Patented June 8, 1965

---

3,188,328
20-ALKYNYLPREGNA-5,16-DIENE-3β,20β-DIOLS AND ESTERS THEREOF
Walter R. Benn, Deerfield, Ill., assignor to G. D. Searle & Co., Chicago, Ill., a corporation of Delaware
No Drawing. Filed May 5, 1964, Ser. No. 365,136
3 Claims. (Cl. 260—397.5)

The present invention is concerned with novel 20-alkynyl-steroids and, more particularly, with 20-alkynyl-pregna-5,16-diene-3β,20β-diols and the corresponding esters represented by the structural formula

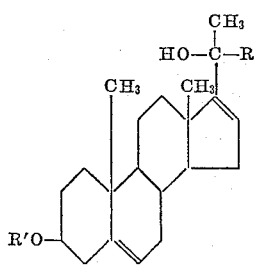

wherein R is a lower alkynyl radical and R' is hydrogen or a lower alkanoyl radical.

The lower alkanoyl radicals encompassed by the R' term are, typically, acetyl, propionyl, butyryl, valeryl, caproyl, and the branched-chain isomers thereof. Examples of the lower alkynyl radicals designated by R are ethynyl, propynyl, butynyl, pentynyl, hexynyl, and the branched-chain groups isomeric therewith.

This application is a continuation-in-part of my copending application Serial No. 61,849, filed October 11, 1960, now U.S. Patent No. 3,132,161.

Starting materials suitable for the manufacture of the instant compounds are the lower alkanoic acid esters of 3β-hydroxypregna-5,16-dien-20-one. Thus, quite unexpectedly in view of the disclosure of Sondheimer et al., J. Org. Chem., 24, 1278 (1959), reaction of the appropriate ester with an alkynyl Grignard reagent, followed by hydrolysis of the Grignard adduct, suitably with aqueous ammonium chloride, and re-esterification of the 3-hydroxy group results in the instant 3β-(lower alkanoyl)oxy-20-(lower alkynyl)pregna-5,16-dien-20β-ols. This addition reaction can be conducted also in the presence of cuprous salts such as cuprous chloride. That process is specifically illustrated by the reaction of 3β-acetoxypregna-5,16-dien-20-one with the ethynyl Grignard reagent, followed by decomposition of the Grignard addition product with aqueous ammonium chloride, then acylation with acetic anhydride in pyridine to produce 3β-acetoxy-20-ethynyl-pregna-5,16-dien-20β-ol. Alternate processes for the preparation of the compounds of this invention involve reaction of the aforementioned 3β-hydroxypregna-5,16-dien-20-one esters with an alkyne, in the presence of lithium amide, or with the appropriate alkynyl lithium reagent. A method particularly suitable for the preparation of the instant compounds, wherein the alkynyl radical contains greater than 2 carbon atoms, involves conversion of the instant ethynyl compounds to their Grignard derivatives, followed by alkylation with a suitable alkyl ester such as ethyl iodide or dimethyl sulfate.

Hydrolysis of the aforementioned 3β-(lower alkanoyl)oxy- 20-(lower alkynyl)pregna - 5,16 - dien-20β-ols, preferably with an alkaline reagent, results in the corresponding 3β-ols. As a specific example, the aforementioned 3β-acetoxy-20-ethynylpregna-5,16-dien-20β-ol is converted to 20-ethynylpregna-5,16-diene-3β,20β-diol by reaction with aqueous potassium carbonate in methanol.

The compounds of this invention display valuable pharmacological properties. They are anti-hormonal agents, for example, as evidenced by their ability to inhibit the sodium-retaining activity of desoxycorticosterone acetate. In addition, they are intermediates to the corresponding 3-keto-Δ⁴ compounds, disclosed and claimed in my copending application Serial No. 61,849. For example, 20-ethynylpregna-5,16-diene-3β,20β-diol is contacted with aluminum isopropoxide and cyclohexanone to afford 20-ethynyl-20β-hydroxypregna-4,16-dien-3-one.

The invention will appear more fully from the examples which follow. These examples are set forth by way of illustration only, and it will be understood that the invention is not to be construed as limited either in spirit or in scope by the details contained therein as many modifications in materials and methods will be apparent from this disclosure to those skilled in the art. In these examples, temperatures are given in degrees centigrade (° C.) and quantities of materials in parts by weight unless otherwise noted.

Example 1

To a saturated solution of acetylene in 1332 parts of dry tetrahydrofuran is added 100 parts by volume of a 3 N ethereal methyl magnesium bromide solution, and the resulting reaction mixture is heated at the reflux temperature for about 2 hours. A solution of 10 parts of 3β-acetoxypregna-5,16-dien-20-one in 90 parts of dry tetrahydrofuran is then added, and refluxing is continued for about 3 hours longer. During that reflux period, the addition of acetylene is continued. The reaction mixture is then cooled, treated with 45 parts by volume of saturated aqueous ammonium chloride, and the resulting supernatant solution is decanted from the precipitated solid material. That aqueous mixture is extracted with ether, and the organic layer is separated, washed with saturated aqueous ammonium chloride, dried over anhydrous sodium sulfate, and concentrated to afford an amber-colored gummy residue. That residue is mixed with 20 parts of acetic anhydride and 100 parts of pyridine, then is heated on the steam bath for about 30 minutes. Dilution with water followed by extraction with benzene affords an organic layer which is dried over anhydrous sodium sulfate, and concentrated to dryness under reduced pressure. The resulting residue is purified by chromatography on an alumina column followed by elution with ethyl acetate-ether mixtures containing increasing proportions of ethyl acetate. The 10% and 20% ethyl acetate in ether eluates are combined and evaporated to dryness to afford a solid residue, which is crystallized from acetone-hexane, resulting in pure 3β-acetoxy-20-ethynylpregna-5,16-dien-20β-ol, M.P. 142.5–144°. This compound displays an optical rotation of −80° in chloroform, infrared absorption peaks at about 2.75, 3.01, 5.76, and 7.93 microns and is further characterized by the following structural formula

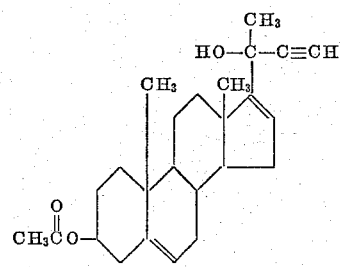

Example 2

The substitution of equivalent quantities of butyne-1, 3β-proprionoxypregna-5,16-dien-20-one, and propionic anhydride in the processes of Example 1 results in 20-(1-butynyl)-3β-propionoxypregna-5,16-dien-20β-ol.

Example 3

To a solution of 8 parts of 3β-acetoxy-20-ethynylpregna-5,16-dien-20β-ol in 200 parts of methanol is added 7 parts of potassium carbonate in 40 parts of water, and the resulting mixture is heated at the reflux temperature, in a nitrogen atmosphere, for about one hour. The reaction mixture is then concentrated to about one-half volume under a stream of nitrogen, and the residual solution is poured into water. The precipitate which forms is collected by filtration, washed on the filter with water, and dried to afford the crude product. Recrystallization from ethyl acetate-methylcyclohexane produces pure 20-ethynylpregna-5,16-diene-3β,20β-diol, which displays a double melting point at about 171–173° and 187–192°. This compound is characterized further by an optical rotation in chloroform of −77° and by the following structural formula

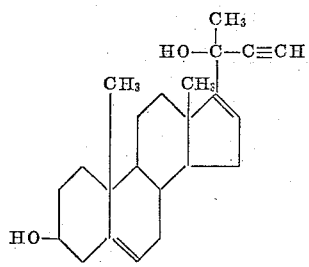

*Example 4*

The substitution of an equivalent quantity of 20-(1-butynyl)-3β-propionoxypregna-5,16-dien-20β-ol in the procedure of Example 3 results in 20-(1-butynyl)pregna-5,16-diene-3β,20β-diol.

*Example 5*

To a solution of 5.2 parts of 20-ethynylpregna-5,16-diene-3β,20β-diol in 435 parts of toluene containing 47.5 parts of cyclohexanone is added 6 parts of aluminum isopropoxide, and the resulting mixture is distilled slowly over a period of about 2 hours, during which time approximately 120 parts by volume of distillate is collected. The reaction mixture is cooled, treated with 300 parts by volume of saturated aqueous sodium potassium tartrate, and steam-distilled to remove the organic solvents. The residual aqueous mixture is cooled, then extracted with ethyl acetate, and the organic extract is dried over anhydrous sodium sulfate, then concentrated to dryness to afford 20-ethynyl-20β-hydroxypregna-4,16-dien-3-one. Recrystallization from ethyl acetate-methylcyclohexane affords a pure sample, which is characterized by a double melting point at about 150° and 189°. In chloroform, it displays an optical rotation of +93° and an ultraviolet maximum at about 241 millimicrons with a molecular extinction coefficient of about 15,900.

*Example 6*

By substituting an equivalent quantity of 20-(1-butynyl)pregna-5,16-diene-3β,20β-diol and otherwise proceeding according to the processes described in Example 5, 20-(1-butynyl)-20β-hydroxypregna-4,16-dien-3-one is produced.

What is claimed is:
1. A compound of the formula

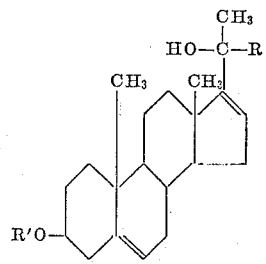

wherein R is a lower 1-alkynyl radical, and R′ is selected from the group consisting of hydrogen and lower alkanoyl radicals.
2. 3β-acetoxy-20-ethynylpregna-5,16-dien-20β-ol.
3. 20-ethynylpregna-5,16-diene-3β,20β-diol.

No references cited.

LEWIS GOTTS, *Primary Examiner.*